US006190099B1

(12) United States Patent
Schulz et al.

(10) Patent No.: US 6,190,099 B1
(45) Date of Patent: *Feb. 20, 2001

(54) MOTOR-DRIVEN HAND TOOL

(75) Inventors: Manfred Schulz, Nürtingen; Klaus Bartmann, Neuffen-Kappishäusern; Ralf Vollweiter, Frickenhausen, all of (DE)

(73) Assignee: Metabowerke GmbH & Co., Nurtingen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/753,244

(22) Filed: Nov. 25, 1996

(30) Foreign Application Priority Data

Nov. 25, 1995 (DE) ........................................ 195 43 992

(51) Int. Cl.[7] ........................... B23L 9/00; B27C 1/00; B23Q 9/00

(52) U.S. Cl. ................ 409/182; 144/119.1; 144/136.45; 144/219; 409/180

(58) Field of Search ................................ 409/175, 181, 409/178, 180, 182; 144/136.95, 135.2, 135.3, 150, 118, 219, 119.1, 115; 407/54, 38, 39

(56) References Cited

U.S. PATENT DOCUMENTS

| | | | | |
|---|---|---|---|---|
| 1,410,350 | * | 3/1922 | Smith et al. | 407/39 |
| 1,460,030 | * | 6/1923 | Mattson | 407/39 |
| 1,962,725 | * | 6/1934 | Severson | 407/39 |
| 2,030,520 | * | 2/1936 | Heimsath | 144/119.1 X |
| 2,149,229 | * | 2/1939 | Reaney | 144/219 X |
| 2,186,417 | * | 1/1940 | Kraus | 144/219 X |
| 2,517,374 | * | 8/1950 | Amon | 144/219 |
| 2,721,502 | * | 10/1955 | Adams | 409/182 |
| 2,746,499 | | 5/1956 | Greeley . | |
| 2,771,104 | | 11/1956 | Saxe | 144/114 |
| 2,997,081 | * | 8/1961 | Christophersen | 144/136.45 X |
| 3,028,152 | * | 4/1962 | Scholl et al. | 144/119.1 X |
| 3,170,373 | * | 2/1965 | Crepeau et al. | 409/182 |
| 3,402,640 | * | 9/1968 | Eisenbach | 409/182 |
| 3,499,365 | * | 3/1970 | Needham | 409/182 |
| 3,716,917 | * | 2/1973 | Ruben | 144/119.1 |
| 3,853,160 | | 12/1974 | Posey . | |
| 4,069,568 | | 1/1978 | Sakamoto et al. . | |
| 4,554,957 | * | 11/1985 | Zayat | 144/115 X |
| 4,674,548 | | 6/1987 | Mills et al. . | |
| 4,993,897 | * | 2/1991 | Anderhalden | 409/180 |

FOREIGN PATENT DOCUMENTS

| | | | | |
|---|---|---|---|---|
| 826350 | * | 7/1949 | (DE) | 409/175 |
| 829794 | * | 1/1952 | (DE) | 409/175 |
| 2253210 | | 5/1974 | (DE) . | |
| 24 45 233 | | 4/1976 | (DE) . | |
| 28 21 431 | | 11/1979 | (DE) . | |
| 687 372 A5 | | 11/1996 | (DE) . | |
| 1 520 140 | | 4/1968 | (FR) . | |
| 1 037 969 | | 8/1966 | (GB) . | |
| 1 498 977 | | 1/1978 | (GB) . | |
| 2 279 292 | | 1/1995 | (GB) . | |
| 522897 | * | 4/1955 | (IT) | 409/175 |
| 1465189 | * | 3/1989 | (SU) | 409/182 |

* cited by examiner

*Primary Examiner*—William Briggs
(74) *Attorney, Agent, or Firm*—Jones, Tullar & Cooper, P.C.

(57) ABSTRACT

The invention relates to a motor-driven hand tool for machining of workpieces, in particular planar workpieces, having a guide surface which can be placed on the workpiece to be treated, and a face milling cutter for processing which projects past the guide surface, and which has an axis of rotation extending perpendicularly to the guide surface.

23 Claims, 5 Drawing Sheets

MOTOR-DRIVEN HAND TOOL

FIELD OF THE INVENTION

The invention relates to a motor-driven hand tool for machining of workpieces, in particular planar workpieces, having a guide surface which can be placed on the workpiece to be treated, and with a face milling cutter for processing projecting past the guide surface, which has an axis of rotation extending perpendicularly with the guide surface.

BACKGROUND OF THE INVENTION

A quite frequent requirement is for having to remove a comparatively thin layer, which can be a layer of old lacquer or a damaged surface layer of the workpiece, from a planar workpiece, for example a table top, a door, a window frame or a parquet floor. Grinding machines, such as belt grinders or orbital sanders, have been employed for this purpose for a long time, but deeper scratches, dents or similar damage cannot be removed by these devices or they can be removed only with a large expenditure of time. The troubling generation of dust must always be tolerated with grinding work. The non-directional cutting edges of the grinding bodies have been shown to be disadvantageous for some types of application. In addition, under strong pressure it is particularly difficult for an untrained layman to guide a grinder, in particular a belt grinder, free of tilt and evenly, so that a level surface is generated. Processing by machining and cutting is given preference for the above mentioned reasons.

A manual planing machine with a roller-shaped planing tool is known from German Patent Publication DE 35 41 728 A1, . This machine defines an axis of rotation which extends parallel with the surface to be worked. However, manual planing machines of this type have the disadvantage that for all practical purposes they can only be moved in the circumferential direction of the planing roller, which extends parallel with the workpiece surface.

Finally, a device defining the species and available in commerce is known by the name "Lamello-Plano", in which a face milling cutter with an axis of rotation extending perpendicularly with the workpiece surface is provided. However, this tool is suitable and intended for a purpose different from that of the present invention. The tool is not intended to be employed for planar removal of a surface layer, but for the removal of a spatially limited overhang, such as is created, for example, by the insertion of a filler claw into a cut-out irregularity of the workpiece. The face milling cutter is disposed with the guide surface to be placed on the workpiece to be processed in an open-edged recess, so that the overhang extends into the cutting range of the face milling cutter in this open-edged recess. When using the known hand tool in accordance with this purpose, the face milling cutter is placed back away from the guide surface. This known hand tool has the further disadvantage that, aside from its purpose of use which is different from that of the present invention, working up to an area of the inner edge is not possible, because housing elements make the approach of the face milling cutter to an edge or step area impossible.

Surface milling cutters are also known which, however, are used in accordance with their purpose for machining surface profiles, such as grooves, dovetailed guides or the like, and furthermore do not permit surface treatment right up to a fold, and edge or a step.

OBJECT AND SUMMARY OF THE INVENTION

It is therefore an object of the present invention to provide an improved motor-driven hand tool of the type mentioned at the outset in with respect to the above explained details, and to embody it particular in such a way that it will become possible to work a surface to be treated by machining up to a shoulder, an edge or a step, and that the hand tool can be used in an advantageous manner, particularly for working a fold area in any arbitrary workpiece.

In connection with a hand tool of the mentioned type this object is attained by means of providing cutting edges on its radial circumference and a face milling cutter projects past a tangent plane delimiting the entire hand tool toward one side, so that it can approach a shoulder, a step or a wall with the tangent plane.

The mentioned plane which is tangent to the device is understood to be an imaginary plane which is tangent to a side of the device at the outside, so that with this plane or up to this plane the device can be brought close to a shoulder, a step or a wall. It is therefore possible to work a surface to be treated, for example a parquet floor, with the cutter on the front of the face milling machine right up to the lateral walls of the room. It is also possible to work a right-angled fold area right up into the fold edge of, for example, the surface of a wing of a window or an area of a stair step, simultaneously with front surface cutting, wherein the face milling cutter simultaneously performs a milling treatment with its radial cutters on the side of the fold facing the radial tool circumference.

In a preferred embodiment of the present invention the face milling cutter projects at several exterior sides past the tangent plane which respectively delimits the tool laterally. If these exterior sides extend approximately at right angles to each other, a very extensive machining treatment of not only a fold area, but also a fold corner area is possible.

It has been shown to be particularly advantageous for the hand tool to have a support plate, which constitutes the guide surface facing the workpiece surface. In a preferred embodiment of the present invention the lateral boundary of the support plate defines at least one of the tangent planes which laterally delimit the device. In that case the face milling cutter then projects with the orbit of its radial cutters past the lateral boundary of the support plate by the amount of the desired milling depth. In this case it has been shown to be particularly advantageous if the lateral boundary of the support plate is embodied flat and therefore can be guided along a flat step area or the like.

The face milling cutter could possibly be disposed in a break of the support plate, however, the support plate preferably has a recess open toward at least one side.

It has been shown to be advantageous, particularly in the case where the face milling cutter has a comparatively large diameter, if a milling head with cutters fixed thereon is used. In this case it is possible to design the cutters in such a way and to fix them releasably on the milling head so that they have cutting edges assigned to the front as well as the circumferential surface of the milling cutter. It often occurs in the course of machining that nails, screws or other interfering insets in the workpiece to be treated are caught by the cutting edges of the milling cutter, which can result in heavy damage to the cutters or the milling cutter, so that they have to be replaced. For this reason it is suggested to use both cutters which are assigned to the front of the milling head, as well as cutters which are assigned to the radial circumference of the milling head.

If only front surface cutting is intended to be performed and therefore the radial cutters extending past the tangent plane are not used, it is recommended to provide a removable safety cover in the area of the lateral overhang of the face milling cutter in order to reduce the danger of injury.

In accordance with a preferred embodiment of the present invention a pivotable protective cover is provided which in its pivoted-out position, which exposes the area of the radial overhang of the face milling cutter, does not project past the tangent plane. For this purpose the protective cover is advantageously designed as a rocker-like component and is arranged so it is pivotable around a pivot axis which preferably extends parallel with the guide surface. Preferably the rocker-like component has a level cover section and an operating surface situated in the area of the pivot axis. By means of manual pressure it is possible to pivot the rocker-like component around the pivot axis, preferably over 180°, so that the cover section can be pivoted into its position in which it exposes the radial overhang of the face milling cutter.

It has furthermore been shown to be quite particularly advantageous that the overhang of the face milling cutter over the guide surface, and thus the milling depth of the face milling cutter, can be adjusted. This can be achieved in a simple manner for example by fastening the face milling cutter on a receiving flange of the tool spindle by means of compensating disks of various thickness. In order to be able to adjust the milling depth in a more operator-friendly way, the face milling cutter is preferably supported on a flange of the tool spindle via spring means. The face milling cutter is pressed against the prestress and adjustably against the flange of the tool spindle by means of suitable adjusting means, for example a set screw, so that the milling depth can be set by a simple actuation of the set screw.

Detent means can be provided in an advantageous manner between the face milling cutter and the flange, which limit the overhang of the face milling cutter past the guide surface and cause a rotating slaving of the milling cutter.

A space bounded by the protective cover can be preferably connected with a dust collection device.

An advantageous embodiment of the present invention will be explained in the drawing representation and in the following description.

DETAILED DESCRIPTION OF THE PREFERRED EMBODIMENTS

Figure 1:
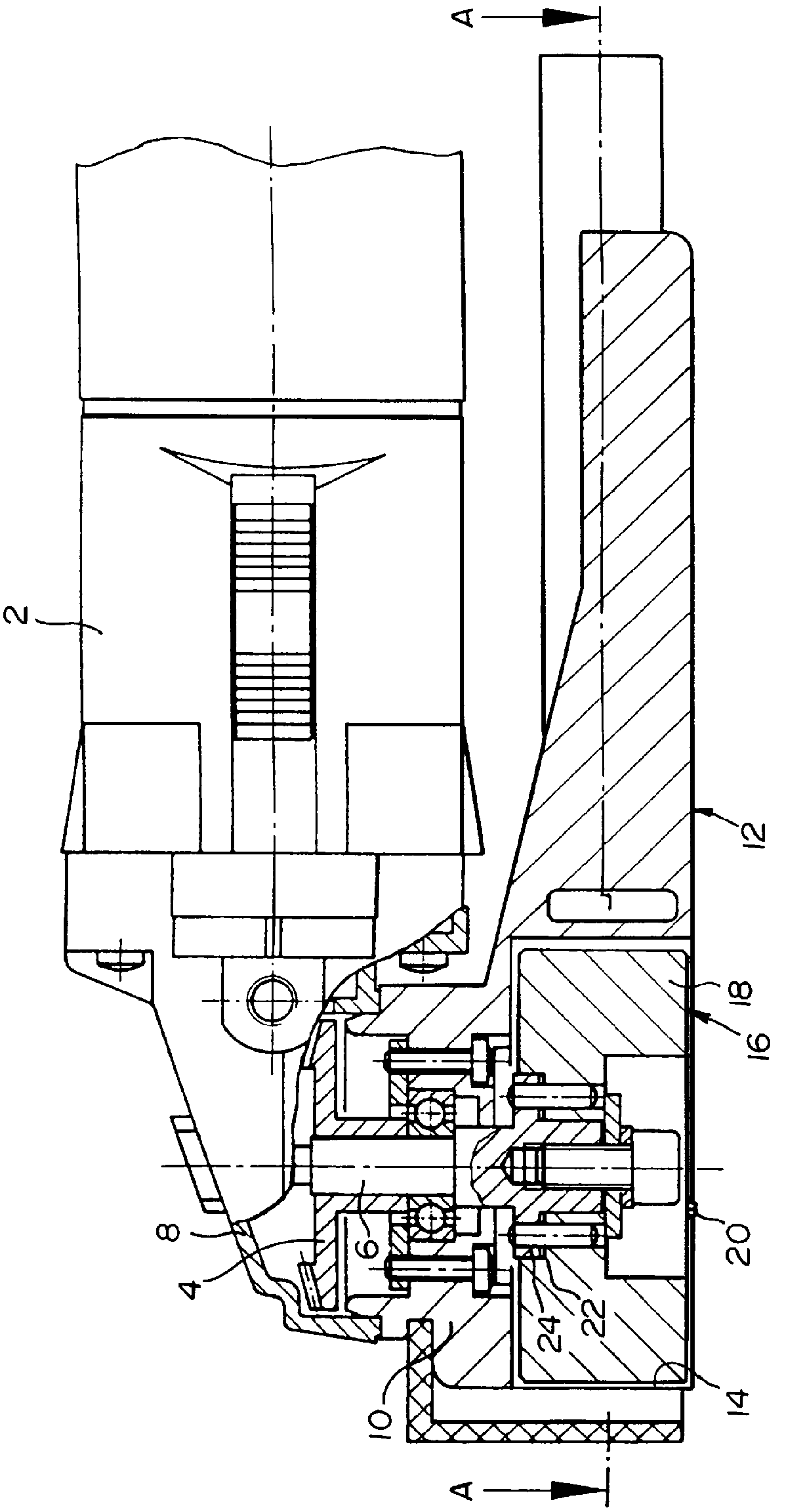
FIG. 1 shows a hand tool in longitudinal section.

The drawing figures represent different views of a motor-driven hand tool for the machining treatment of a workpiece for creating essentially planar surfaces. The device comprises a housing 2 in which a drive motor, not described in more detail, is housed, which drives a tool spindle 6 via a gear 4. The gear 4 is housed in a metal gear housing 8, which is connected with the housing 2, and the tool spindle 6 extends out of this gear housing 8 into the interior of a support plate 10. The support plate 10 is mounted on the gear housing 8 and, on its side facing away from the gear housing 8, forms a guide surface 12 to be placed on the surface of the workpiece to be treated. A recess 14 formed perpendicularly with respect to the guide surface 12, into which a face milling cutter 16 can be inserted and mounted, fixed against relative rotation, on the free end of the tool spindle 6, is provided in the support plate 10. The face milling cutter 16 consists of a milling head 18 or base body, on which cutters 20 are exchangeably fastened. The face milling cutter 16 has been installed on the tool spindle 6 inside the recess 14 in such a way that the orbit of the cutters 20 project outwardly from the guide surface 12 by the desired milling depth, which can lie in the range between 0.1 and 1 mm, for example. The milling depth is adjustable; for example in the represented embodiment it is varied in that compensating disks 22 of various thicknesses are placed between a receiving flange 24 of the tool spindle 6 and the milling head 18. It is understood that the milling depth can also be designed to be adjustable in a different way.

Figure 2:
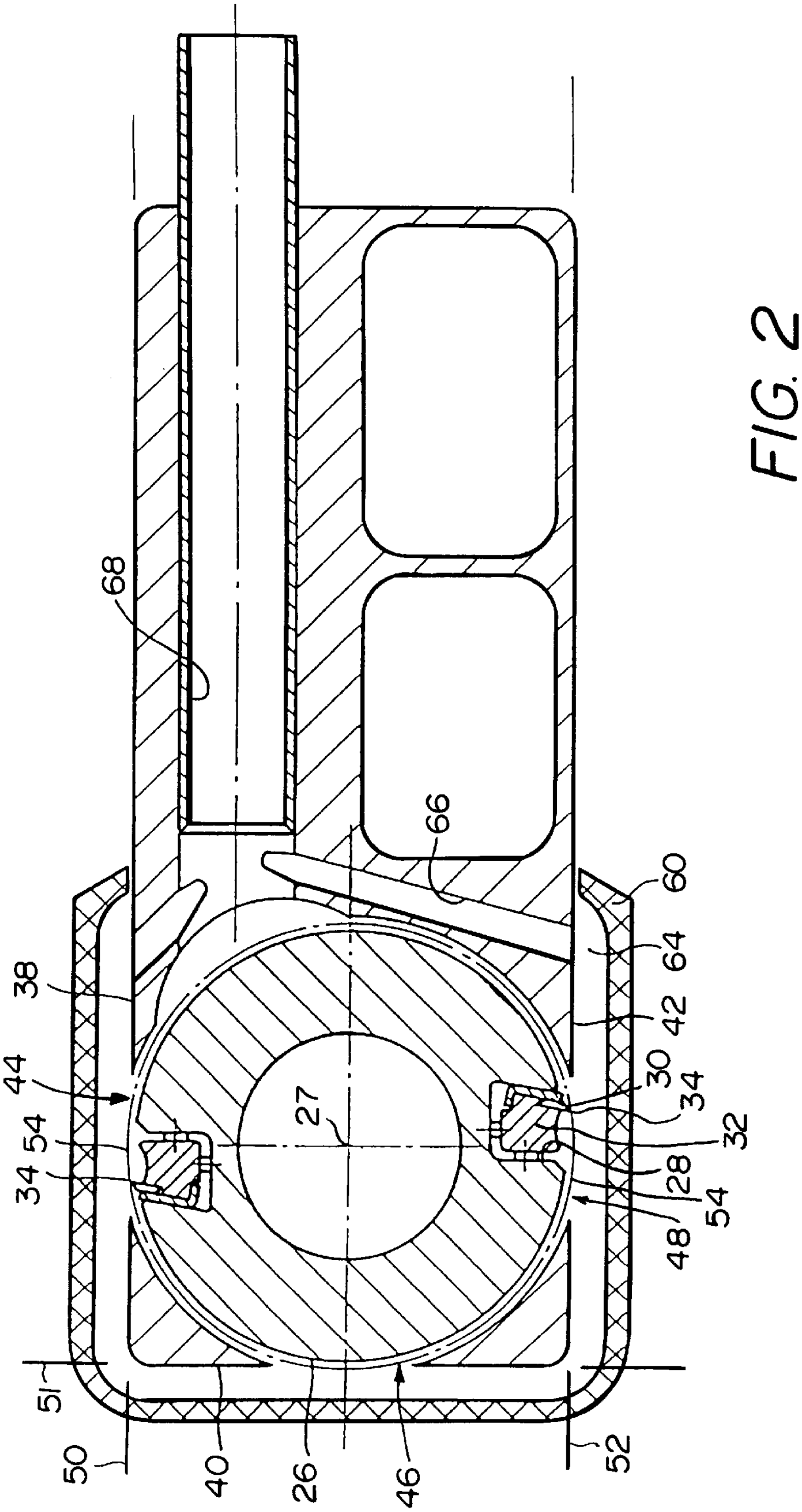
FIG. 2 represents a section along the line A—A in FIG. 1.

As can be seen from FIG. 2, the face milling cutter 16 has grooves 28 on its radial circumference 26, which extend parallel with the axis of rotation 27 and into which cutters 30 have been inserted and are held by suitable clamping means 32. The cutters 30 have cutting edges 34 extending in the direction of the axis of rotation 27 of the face milling cutter 16, which project past or outwardly of radial circumference 26 of the milling head 18. On three exteriors 38, 40, 42, which extend at right angles to each other, the support plate 10 has rectangularly shaped openings 44, 46, 48 toward the recess 14, within which the face milling cutter 16 is arranged. The exteriors 38, 40, 42 of the support plate 10 define tangent planes 50, 51, 52, up to which the represented hand tool can approach a step, edge or shoulder area. The face milling cutter 16 or the cutters 30 are arranged in the recess 14 in such a way that the orbit 54 of the cutting edges 34 projects past the tangent planes 50, 51, 52, so that working of a fold is possible.

A protective cover 60 or 62 is furthermore represented in the drawing figures, which screens the area of the overhang of the cutters 30 past the lateral openings 44, 46, 48 provided on the circumference 26 of the face milling cutter 16, and in this way protects a user from injury when the hand tool is only to be used for front surface cutting.

Figure 3:
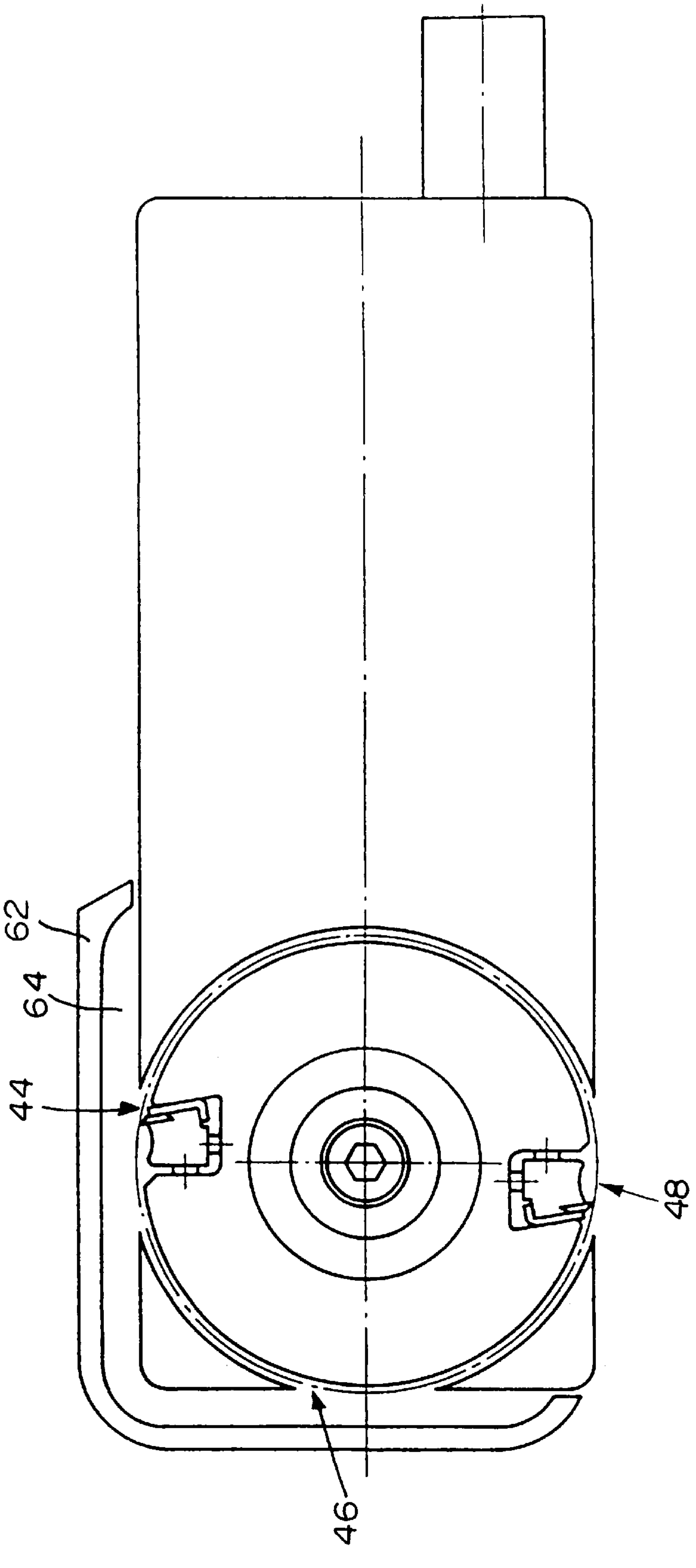
FIG. 3 is a view of the hand tool from below.

The protective cover 62 represented in FIG. 3, however, only covers the lateral openings 44 and 46 and leaves the opening 48 free for treating a workpiece.

Together with the support plate 10, the protective covers 60, 62 delimit a space 64, which communicates via dust collection conduits 66 (FIG. 2) with a dust collection conduit 68 extending in the longitudinal direction and which in turn can be connected with a dust collection device, not represented.

Figure 4:
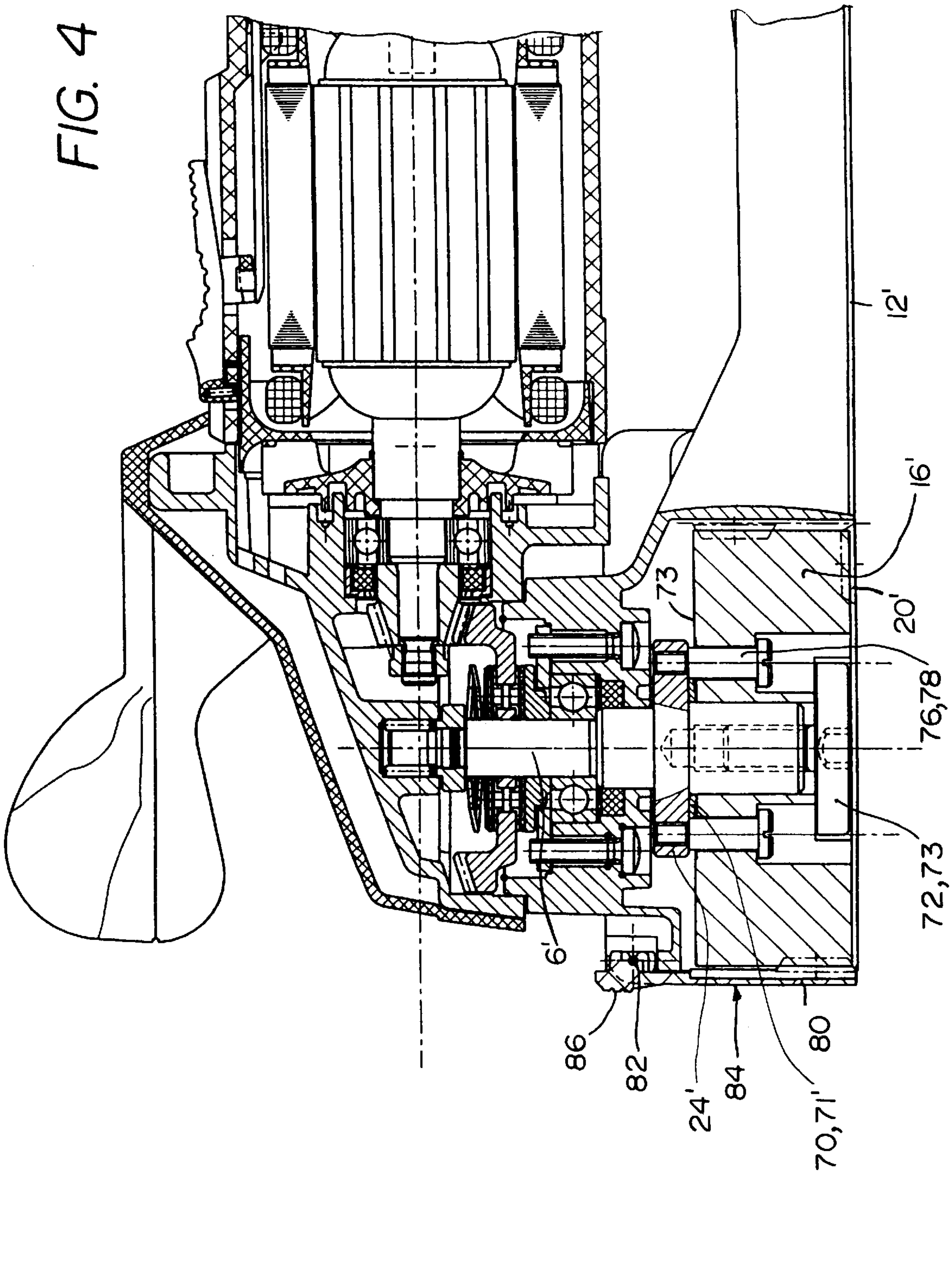
FIG. 4 shows a further embodiment of a hand tool in accordance with the present invention in longitudinal section.

The hand tool shown in FIG. 4 shows a design which is comparable within the framework of the instant invention, wherein the differences will be described hereinbelow.

Figure 5:
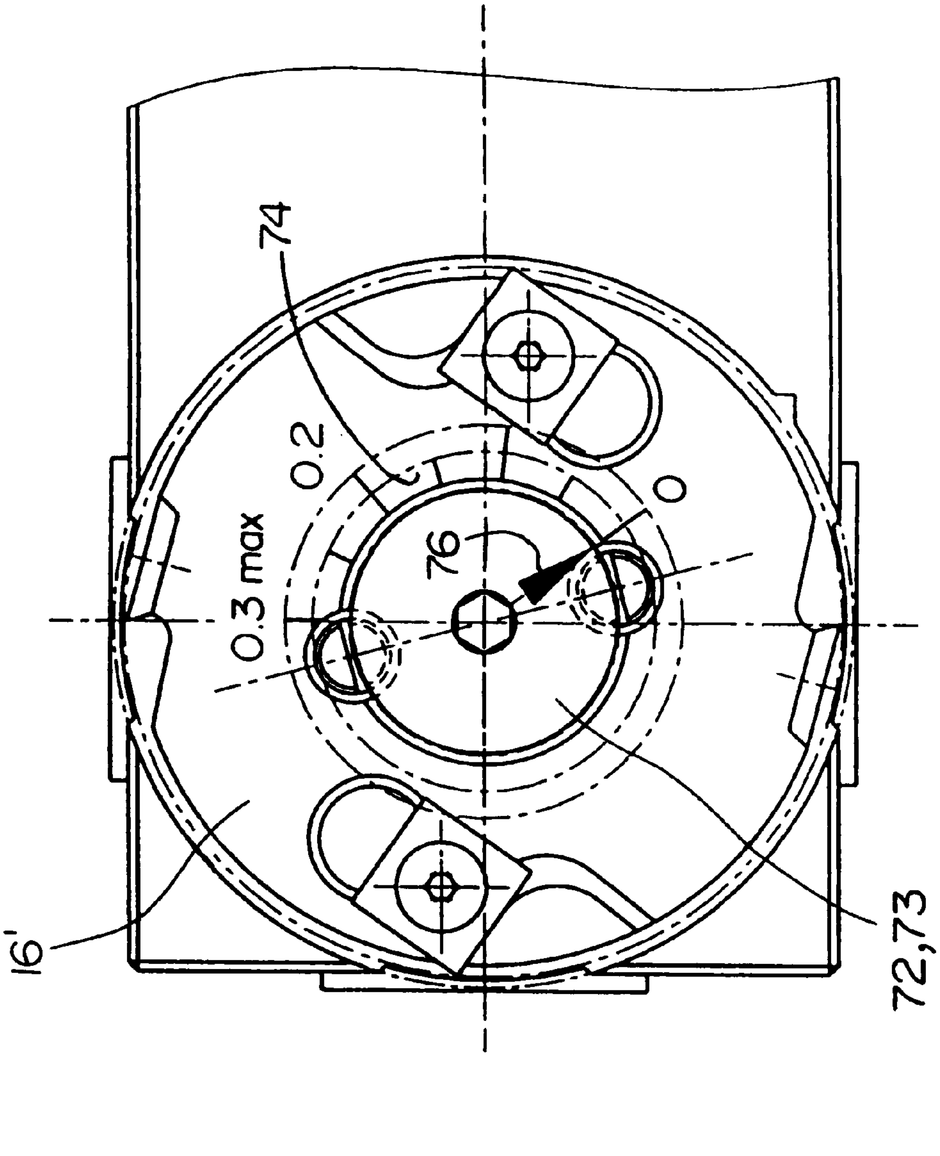
FIG. 5 is a view of the hand tool in FIG. 4 from below.

While in the embodiment in accordance with FIGS. 1 to 3 the milling depth, i.e. the overhang of the face milling cutters 16 past the guide surface 12, was achieved by means of compensating disks 22 of various thicknesses, a spring means 70 in the form of a plate spring 71, which is clamped between a receiving flange 24' and a face 73 of the face milling cutter 16', is provided in the present case in place of a compensating disk 22. Accordingly, the face milling cutter 16', is prestressed by the plate spring 71 away from the receiving flange 24' projecting in the direction past the guide surface 12'. An adjusting means 72 in the form of a set screw 73 counteracts this prestress, and is screwed, flush with the tool spindle and extending through the face milling cutter 16', into a threaded bore of the receiving flange 24' from the direction of the side of the face milling cutter 16' facing the workpiece. By turning this set screw 73, it is possible to displace the front milling cutter 16' in the axial direction to a greater or lesser degree against the receiving flange 24', because of which the length of the cutters 20' projecting past the guide face 12' is changed, along with the milling depth. A scale 74 (FIG. 5) for exact setting is provided on the front side of the face milling cutter 16' facing the tool, and the set screw 73 has a marker 76 corresponding with this.

In order to be able to set the milling depth to a desired value, the tool spindle is blocked by means of a spindle detent, not shown in detail, for example a pin engaging a radial recess of the tool spindle, and then the distance of the face milling cutter 16' from the receiving flange 24' is set by turning the set screw 73.

Detent means 76 in the form of shoulder screws 78 are furthermore provided, which are provided in a stepped bore of the face milling cutter 16' and, projecting through it, are screwed into threaded bores of the receiving flanges 24'. On the one hand they constitute the rotating slaving of the face milling cutter 16' and, on the other hand, they delimit a maximally settable milling depth with their shoulders.

A protective cover which can be pivoted away is identified by the reference numeral 80 and in FIG. 4 covers the radial overhang of the face milling cutter 16'. This is a rocker-like component, which can be upwardly pivoted over slightly more than 1800 around an axis 82 extending perpendicularly with the drawing plane. The rocker-like component comprises a planar cover section 84 and an actuating area 86 which can be operated by manual pressure. Three such protective covers 80 are provided, as can be seen from FIG. 5.

What is claimed is:

1. A motor-driven hand tool for machining of workpieces, comprising:

means defining a guide surface which can be placed on the workpiece to be machined;

a face milling cutter which extends outwardly from said guide surface, said face milling cutter defining an axis of rotation which extends perpendicular to said guide surface and a radial circumferential surface; and at least one means mounted to said face milling cutter and defining a cutting edge which extends outwardly of said radial circumferential surface, wherein three planes are defined by said tool each of which extends as a tangent to said radial circumferential surface where said cutting edge extends outwardly of said radial circumferential surface such that said cutting edge can approach one of a shoulder, a step and a wall, and with said radial circumferential surface extending outwardly from each of said planes.

2. The motor-driven hand tool as defined in claim 1, wherein said support plate defines a recess which opens toward one side of said tool, said face milling cutter being disposed in said recess.

3. The motor-driven hand tool as defined in claim 1, wherein the lateral delimitation of said hand tool is embodied flat.

4. The motor-driven hand tool as defined in claim 1, wherein said means defining a guide surface comprises a support plate.

5. The motor-driven hand tool as defined in claim 1, further comprising:

a removable protective cover mounted to said tool adjacent said face milling cutter, at at least where said face milling cutter defines a cutting edge which extends outwardly of said radial circumferential surface.

6. The motor-driven hand tool as defined in claim 5, further comprising:

a dust collective device, wherein said protective cover and said milling cutter defining a space connected to said dust collecting device.

7. The motor-driven hand tool as defined in claim 6, wherein said means defining a guide surface comprises a support plate, and wherein said dust collecting device includes a dust collecting conduit formed in said support plate.

8. The motor-driven hand tool as defined in claim 1, further comprising:

means for adjusting the outward extent of said face milling cutter from said guide surface.

9. The motor-driven hand tool as defined in claim 4, wherein said support plate defines said three planes.

10. The motor-driven hand tool as defined in claim 5, wherein said removable protective cover is pivoted away from said face milling cutter.

11. A motor-driven hand tool for machining of workpieces, comprising:

means defining a guide surface which can be placed on the workpiece to be machined;

a face milling cutter which extends outwardly from said guide surface, said face milling cutter defining an axis of rotation which extends perpendicular to said guide surface, and a radial circumferential surface extending generally parallel to said axis of rotation;

at least one means mounted to said face milling cutter and defining a cutting edge which extends outwardly from said radial circumferential surface;

a removable protective cover mounted to said tool adjacent said face milling cutter, at at least where said face milling cutter defines a cutting edge which extends outwardly of said radial circumferential surface; and means for adjusting the outward extent of said face milling cutter from said guide surface, said means for adjusting comprising spring means extending along the axis of rotation of said face milling cutter;

wherein said face milling cutter comprises a milling head to which said at least one means is mounted which defines a cutting edge, and to which at least one further cutter is mounted which extends outwardly from said guide surface, and wherein a plane is defined by said tool which extends as a tangent to said radial circumferential surface where said cutting edge extends outwardly of said radial circumferential surface such that said cutting edge can approach one of a shoulder, a step and a wall.

12. A motor-driven hand tool for machining of workpieces, comprising:

means defining a guide surface which can be placed on the workpiece to be machined;

a face milling cutter which extends outwardly from said guide surface, said face milling cutter defining an axis of rotation which extends perpendicular to said guide surface, and a radial circumferential surface extending generally parallel to said axis of rotation;

at least one means mounted to said face milling cutter and defining a cutting edge which extends outwardly of said radial circumferential surface;

a removable protective cover mounted to said tool adjacent said face milling cutter, at at least where said face milling cutter defines a cutting edge which extends outwardly of said radial circumferential surface;

means for adjusting the outward extent of said face milling cutter from said guide surface; and a spindle to which said face milling cutter is mounted, said spindle defining a flange, wherein said means for adjusting presses said face milling cutter against said flange, wherein said face milling cutter comprises a milling head to which said at least one means is mounted which defines a cutting edge, and to which at least one further cutter is mounted which extends outwardly from said guide surface, and wherein a plane is defined by said tool which extends as a tangent to said radial circumferential surface where said cutting edge extends outwardly of said radial circumferential surface such that said cutting edge can approach one of a shoulder, a step and a wall.

13. A motor-driven hand tool for machining of workpieces, comprising:

means defining a guide surface which can be placed on the workpiece to be machined;

a face milling cutter which extends outwardly from said guide surface, said face milling cutter defining an axis of rotation which extends perpendicular to said guide surface and a radial circumferential surface;

at least one means mounted to said face milling cutter and defining a cutting edge which extends outwardly of said radial circumferential surface;

means for adjusting the outward extent of said face milling cutter from said surface; and a spindle to which said face milling cutter is mounted, said spindle defining a flange, wherein said means for adjusting presses said face milling cutter against said flange, a plane is defined by said tool which extends as a tangent to said radial circumferential surface where said cutting edge extends outwardly of said radial circumferential surface such that said cutting edge can approach one of a shoulder, a step and a wall.

14. A motor-driven hand tool for machining of workpieces, comprising:

means defining a guide surface which can be placed on the workpiece to be machined;

a face milling cutter which extends outwardly from said guide surface, said face milling cutter defining an axis of rotation which extends perpendicular to said guide surface and a radial circumferential surface;

at least one means mounted to said face milling cutter and defining a cutting edge which extends outwardly of said radial circumferential surface; and means for adjusting the outward extent of said face milling cutter from said guide surface, wherein a plane is defined by said tool which extends as a tangent to said radial circumferential surface where said cutting edge extends outwardly of said radial circumferential surface such that said cutting edge can approach one of a shoulder, a step and a wall, and said means for adjusting comprises spring means extending along the axis of rotation of said face milling cutter.

15. The motor-driven hand tool as defined in claim 13, further comprising:

detent means situated between said flange and said face milling cutter, which limits the outward extent of said face milling cutter relative to said guide surface.

16. The motor-driven hand tool as defined in claim 12, further comprising:

detent means situated between said flange and said face milling cutter, which limits the outward extent of said face milling cutter relative to said guide surface.

17. The motor-driven hand tool as defined in claim 13, wherein said means defining a guide surface comprises a support plate.

18. The motor-driven hand tool as defined in claim 17, wherein three planes are defined by said tool which extend as tangents to said radial circumferential surface, with said radial circumferential surface extending outwardly from each of said planes, and wherein said support plate defines said three planes.

19. The motor-driven hand tool as defined in claim 17, wherein said support plate defines a recess which opens toward one side of said tool, said face milling cutter being disposed in said recess.

20. The motor-driven hand tool as defined in claim 13, wherein the lateral delimitation of said hand tool is embodied flat.

21. The motor-driven hand tool as defined in claim 13, further comprising:

a dust collective device, wherein said protective cover and said milling cutter defining a space connected to said dust collecting device.

22. The motor-driven hand tool as defined in claim 21, wherein said means defining a guide surface comprises a support plate, and wherein said dust collecting device includes a dust collecting conduit formed in said support plate.

23. The motor-driven hand tool as defined in claim 13, wherein said removable protective cover includes means for pivoting said cover away from said milling cutter.

* * * * *